United States Patent
Jang et al.

(10) Patent No.: US 9,736,161 B2
(45) Date of Patent: Aug. 15, 2017

(54) METHOD AND SYSTEM FOR PREVENTING INFORMATION LEAKAGE BASED ON TELEPHONE

(71) Applicant: THINKAT CO., LTD., Seoul (KR)

(72) Inventors: Wha Cheol Jang, Seoul (KR); Je Kee Park, Seoul (KR); Gwang Ho Ko, Incheon (KR)

(73) Assignee: THINKAT CO., LTD., Seoul (KR)

( * ) Notice: Subject to any disclaimer, the term of this patent is extended or adjusted under 35 U.S.C. 154(b) by 0 days.

(21) Appl. No.: 14/899,116

(22) PCT Filed: Jun. 16, 2014

(86) PCT No.: PCT/KR2014/005271
§ 371 (c)(1),
(2) Date: Dec. 16, 2015

(87) PCT Pub. No.: WO2014/204159
PCT Pub. Date: Dec. 24, 2014

(65) Prior Publication Data
US 2016/0142412 A1 May 19, 2016

(30) Foreign Application Priority Data
Jun. 17, 2013 (KR) .................... 10-2013-0069087

(51) Int. Cl.
*H04L 29/06* (2006.01)
*G06F 21/43* (2013.01)
*G06F 21/62* (2013.01)

(52) U.S. Cl.
CPC .............. *H04L 63/10* (2013.01); *G06F 21/43* (2013.01); *G06F 21/6209* (2013.01); *H04L 63/0428* (2013.01); *H04L 63/20* (2013.01)

(58) Field of Classification Search
CPC ..... H04L 63/20; H04L 63/0428; H04L 63/10; G06F 21/6209; G06F 21/43
(Continued)

(56) References Cited

U.S. PATENT DOCUMENTS 8,286,253 B1 * 10/2012 Lu .................... G06F 21/6218
726/26
8,706,486 B1 * 4/2014 Devarajan ........... G06F 21/6245
704/235

(Continued)

FOREIGN PATENT DOCUMENTS

JP S62126758 A 6/1987
JP H07319691 A 12/1995
(Continued)

OTHER PUBLICATIONS

International Search Report dated Sep. 17, 2014.

*Primary Examiner* — Haresh N Patel

(57) ABSTRACT

The present invention relates to a method and a system for preventing an information leakage based on a telephone authentication. The present invention includes a first step in which a telephone-authentication data-loss-prevention (DLP) file policy is set by a generator as a user of a user terminal assembly including a server-connection terminal through using the server-connection terminal and the server-connection terminal sends the telephone-authentication DLP file policy and requests a generation of a telephone-authentication DLP file to a DLP server assembly through an internet network; a second step in which the DLP server assembly generates a contents identification (CID) by using information including the telephone-authentication DLP file policy and stores a telephone-authentication DLP file information including the CID and the telephone-authentication DLP file policy; and a third step in which the server-connection terminal or the DLP server assembly generates (Continued)

the telephone-authentication DLP file, wherein the telephone-authentication DLP file including the CID as a header of an original data file that is a general file. A telephone authentication is needed when a reader reads the generated telephone-authentication DLP file.

The method and the system for preventing the information leakage based on the telephone authentication according to an embodiment of the present invention, secure can be effectively enhanced by combining a DLP and a telephone authentication. Also, even though data is leaked, a location of the data can be known through the telephone authentication. Also, encryption of all kinds of data such as personal information, a general document, and so on is possible. Thus, applicable objects and scopes can be broadened.

13 Claims, 12 Drawing Sheets

(58) Field of Classification Search
USPC .......................................... 713/168; 726/28
See application file for complete search history.

(56) References Cited

U.S. PATENT DOCUMENTS

| | | | |
|---|---|---|---|
| 2010/0102023 A1* | 4/2010 | Yarro | A63H 27/005 215/382 |
| 2010/0281254 A1 | 11/2010 | Carro et al. | |
| 2011/0138192 A1* | 6/2011 | Kocher | G06F 21/602 713/189 |
| 2011/0302627 A1* | 12/2011 | Blom | H04L 63/0492 726/2 |
| 2011/0317824 A1* | 12/2011 | Kim | H04L 63/18 379/142.05 |
| 2013/0191902 A1* | 7/2013 | Friedl | H04L 9/3271 726/7 |
| 2014/0150072 A1* | 5/2014 | Castro | G06F 21/31 726/5 |

FOREIGN PATENT DOCUMENTS

| | | |
|---|---|---|
| JP | 2004318598 A | 11/2004 |
| JP | 2005149234 A | 6/2005 |
| JP | 2006080966 A | 3/2006 |
| JP | 2008136117 A | 6/2008 |
| JP | 2009503661 A | 1/2009 |
| JP | 2010199944 A | 9/2010 |
| JP | 2010199997 A | 9/2010 |
| JP | 2011070693 A | 4/2011 |
| JP | 2012009003 A | 1/2012 |
| KR | 1998022833 A | 7/1998 |
| KR | 20010028575 A | 4/2001 |
| KR | 1020030086747 A | 11/2003 |
| KR | 1020080025169 A | 3/2008 |
| KR | 1020100040074 A | 4/2010 |
| KR | 1020120114637 A | 10/2012 |
| WO | 2011074500 A1 | 6/2011 |

* cited by examiner

FIG. 3

| Telephone-authentication DLP file policy | | |
|---|---|---|

Reading period
◎ No limitation   ◎ Period limitation   [2013-05-05-00:00:00] ~ [2013-05-05-00:00:00]

Reading time
◎ No limitation   ◎ Time limitation   [09:00] ~ [18:00]

Reading country
◎ No limitation   ◎ Country limitation   [Korea / Japan]

Reading number
◎ No limitation   ◎ Number limitation   [3] times

Authentication number setting
◎ Designation number notification method
◎ One-time password notification method   [2]   digits (2 to 8 digits)
◎ Password registration method   [02:04]   digits (2 to 8 digits)

Authentication-error number limitation setting
◎ No limitation   ◎ Number limitation   [3]   times (2~5회 : 2 to 5 times)

Telephone authentication method
Telephone number of owner [            ]   Telephone number of reader [01012345678]
◎ Telephone authentication   ◎ Telephone authentication   ◎ Direct input of telephone number
       of owner                              of reader                              of reader
◎ Parallel telephone authentication of generator and reader
    ◎ Additional authentication permission   ◎ Only simultaneous authentication permission

Block & Discard setting
◎ No limitation   ◎ Block (A function of removing a DLP file in a case that an authentication
                          request is sent to an owner when unauthorized person tries to
                          read after an owner telephone-authentication policy is generated)

FIG. 5
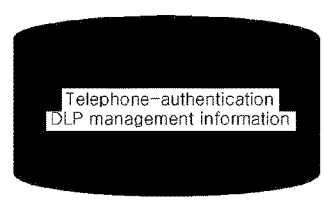
(a)
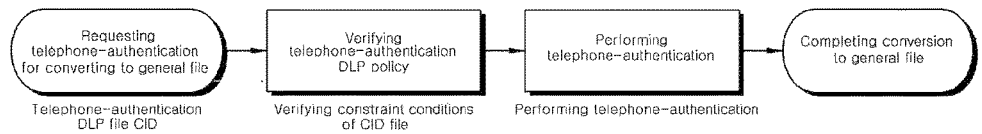
(b)
| Requesting telephone-authentication for converting to general file | → | Verifying telephone-authentication DLP policy | → | Performing telephone-authentication | → | Completing conversion to general file |
|---|---|---|---|---|---|---|
| Telephone-authentication DLP file CID | | Verifying constraint conditions of CID file | | Performing telephone-authentication | | |
(c)

METHOD AND SYSTEM FOR PREVENTING INFORMATION LEAKAGE BASED ON TELEPHONE

CROSS-REFERENCE

This application is a 371 of PCT/KR2014/005271 filed Jun. 16, 2014, which claims the benefit of foreign priority of Korean Patent Application No. 10-2013-0069087 filed Jun. 17, 2013, the subject matter of which is hereby incorporated by reference in its entirety.

TECHNICAL FIELD

The present invention relates to a method and a system for preventing an information leakage based on a telephone authentication, and, more particularly, to a method and a system for preventing an information leakage based on a telephone authentication for performing a generation function of a telephone-authentication DLP file as a core function and for performing a management function of a telephone-authentication DLP policy, a management function of an ARS voice-phishing prevention policy, a management function of a CID, a management function of verifying a policy depending on a telephone-authentication DLP file, and a management function of a call forwarding setting based on a signal as additional functions.

BACKGROUND ART

A data loss prevention (DLP) is for preventing an information leakage. Recently, lots of companies introduce and use a DLP system in order to prevent the information leakage. However, applicable objects and scopes of the DLP system are limited. In addition, there is a digital right management (DRM) method as a different method for preventing the information leakage, and a technic being developed in order to protect copyright of digital contents and limiting users depending on digital contents is used.

The representative methods for preventing the information leakage are mainly classified into three methods. First, the method for preventing the information leakage may be achieved by a user terminal. In this instance, it is achieved by a limitation of media, such as, a prohibition of a data copy to an external storing device of the user terminal, and an external transfer of the limited data by using a security universal serial bus (USB) is allowed. Secondly, the method for preventing the information leakage may be achieved by a server. In this method, the user terminal does not include an additional file store and all data is managed at the server by using a virtual disk and so on. Thirdly, the method for preventing the information leakage may be achieved over a network. In this method, a flow of data is detected through the network in real time, and the flow of the data is blocked if necessary.

On the other hand, these conventional methods of preventing the information leakage have limitations on applicable objects and scopes and are generally used for managing sensitive information in companies. The general users generally use indirect methods of applying a document code or using a compaction program. Also, security after the data leakage may be not secured although the DLP system is used.

[Related Technical Literature]
1. Telephone settlement authentication system and method using IP position information (Korean Patent Application No. 10-2005-0116850)

2. Phone Receipt Mode Conversion Apparatus and Method for Switching to Bell Mode using Mode Change Authentication Information (Korean Patent Application No. 10-2008-0086701)

DISCLOSURE

Technical Problem

The present invention is to solve the above problems, and is to provide a method and a system for preventing an information leakage based on a telephone authentication for performing a generation function of a telephone-authentication DLP file as a core function and for performing a management function of a telephone-authentication DLP policy, a management function of an ARS voice-phishing prevention policy, a management function of a CID, a management function of verifying a policy depending on a telephone-authentication DLP file, and a management function of a call forwarding setting based on a signal as additional functions.

However, objects of the present invention are not limited to the above-mentioned object, and other objects that are not stated in the above will be understood from the following descriptions by a skilled person in the art.

Technical Solution

In order to achieve the above objects, a method for preventing an information leakage based on a telephone authentication according to an embodiment of the present invention includes a first step in which a telephone-authentication data-loss-prevention (DLP) file policy is set by a generator as a user of a user terminal assembly including a server-connection terminal through using the server-connection terminal and the server-connection terminal sends the telephone-authentication DLP file policy and requests a generation of a telephone-authentication DLP file to a DLP server assembly through an internet network; a second step in which the DLP server assembly generates a contents identification (CID) by using information including the telephone-authentication DLP file policy and stores a telephone-authentication DLP file information including the CID and the telephone-authentication DLP file policy; and a third step in which the server-connection terminal or the DLP server assembly generates the telephone-authentication DLP file, wherein the telephone-authentication DLP file including the CID as a header of an original data file that is a general file. A telephone authentication is needed when a reader reads the generated telephone-authentication DLP file.

Also, in order to achieve the above objects, a system for preventing an information leakage based on a telephone authentication according to an embodiment of the present invention includes a server-connection terminal used by a user for generating or reading a telephone-authentication DLP file; and a DLP server assembly connected to the server-connection terminal through an internet network. A telephone-authentication DLP file policy is set by the user through using the server-connection terminal and the sever-connection terminal sends the telephone-authentication DLP file policy and requests a generation of a telephone-authentication DLP file to the DLP server assembly. The DLP server assembly generates a contents identification (CID) by using information including the telephone-authentication DLP file policy and stores a telephone-authentication DLP file information including the CID and the telephone-authentication DLP file policy. The server-connection terminal or the DLP server assembly generates the telephone-authentication DLP file including the CID as a header of an original data file that is a general file. A telephone authentication is needed when a reader reads the generated telephone-authentication DLP file.

Advantageous Effects

A method and a system for preventing an information leakage based on a telephone authentication according to an embodiment of the present invention, secure can be effectively enhanced by combining a DLP and a telephone authentication. Also, even though data is leaked, a location of the data can be known through the telephone authentication. Also, encryption of all kinds of data such as personal information, a general document, and so on is possible. Thus, applicable objects and scopes can be broadened.

More particularly, as a general aspect, since an internet network should be connected in order to request a telephone authentication, a file can be read only in an online state, and the authentication position can be known by confirming a base-station information of the telephone authentication by properties of the telephone authentication.

With respect to constraint conditions and a policy, a policy management according to sensitivity of a file is possible by setting constraint conditions, such as, a number, time, and a country of reading, and path tracing of the file leakage can be possible.

Also, an one-time reading information, such as, a file attached to an e-mail can be provided, and thus, an input of personal information, such as, a birth date or a part of a resident registration number, is not needed to confirm an e-mail of a credit card bill. When an important e-mail is attached, it can be confirmed whether the e-mail is normally transferred to a receiver through the telephone authentication.

BRIEF DESCRIPTION OF THE DRAWINGS

FIG. 3 is an example of a user interface screen where a management function of a telephone-authentication DLP policy is performed by the system for preventing the information leakage based on the telephone authentication according to an embodiment of the present invention.

FIG. 5 illustrates a management function of a policy depending on a telephone-authentication DLP file performed by the system for preventing the information leakage based on the telephone authentication according to an embodiment of the present invention.

DETAILED DESCRIPTION OF EMBODIMENTS

Hereinafter, preferred embodiments of the present invention will be described in detail with reference to accompanying drawings. In the following descriptions for describing the present invention, the detailed descriptions will be omitted when the detailed descriptions on the related prior art or composition unnecessarily confuses the present invention.

In the specification, when one element sends data or a signal to another element, the one element may directly send the data or the signal to the another element, or the one element may send the data or the signal to the another element through the other element.

Figure 1:
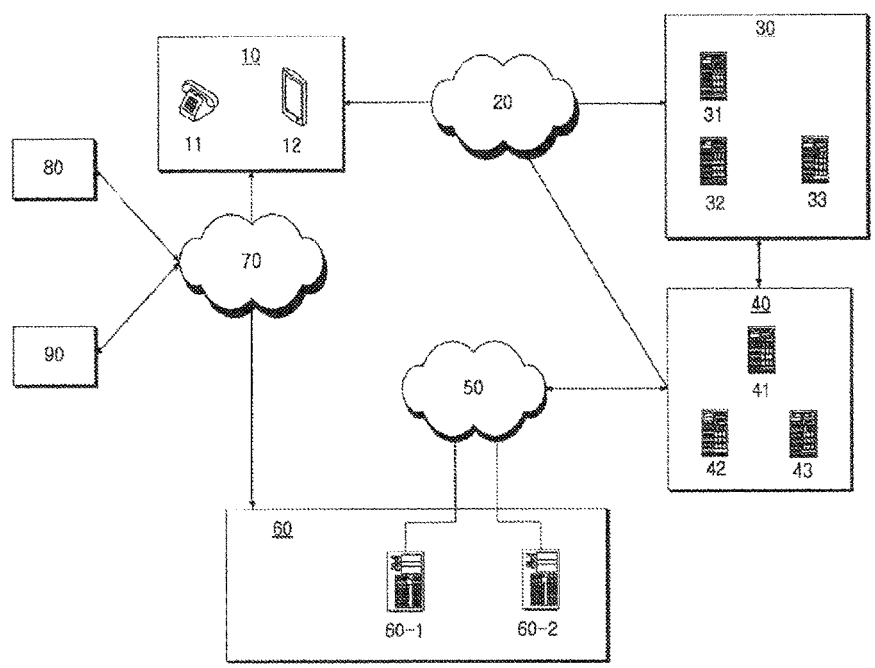
FIG. 1 illustrates a system for preventing an information leakage based on a telephone authentication according to an embodiment of the present invention.

FIG. 1 illustrates a system for preventing an information leakage based on a telephone authentication according to an embodiment of the present invention. Referring to FIG. 1, a system for preventing an information leakage based on a telephone authentication includes a user terminal assembly 10, an internet network 20, a DLP server assembly 30, an electronic authentication server assembly 40, a transmission control protocol/internet protocol (TCP/IP) 50, and an alliance mobile-service-company server assembly 60.

The user terminal assembly 10 includes a telephone terminal 11 and a server-connection terminal 12 that are terminals operated and possessed by the same user.

The telephone terminal 11 includes various types of terminals providing wire-wireless voice communications. The server-connection terminal 12 broadly implies a wire terminal or a wireless terminal having an access function to the internet network 20. For example, the server-connection terminal 12 may include a personal computer (PC), an internet protocol television (IP television), a notebook-sized personal computer, a personal digital assistant (PDA), a smartphone, an international mobile telecommunication 2000 (IMT-200) phone, a global system for mobile communication (GSC) phone, a general packet radio service (GPRS) phone, a wideband code division multiple access (WCDMA) phone, a universal mobile telecommunication service (UMTS) phone, a mobile broadband system (MBS) phone, and so on. The server-connection terminal 12 has a function for transmitting and receiving of data about voice and image to the other terminals, servers, and systems.

The internet network 20 may be a next-generation wire and wireless network for providing a high-speed multimedia service. The internet network 20 mutually transfers signals and data between the server-connection terminal 12, the DLP server assembly 30, the electronic authentication server assembly 40, and the other systems.

The DLP server assembly 30 includes a telephone-authentication DLP file server 31, a DLP link server 32, and a telephone-authentication DLP management server 33. The DLP server assembly 30 performs a generation function of a telephone-authentication DLP file as a core function. That is, the DLP server assembly 30 performs a generation function of a telephone-authentication DLP file by covering (or recording) a telephone authentication header to an original data file through transmitting and receiving of data with the server-connection terminal 12.

Also, as additional functions, first, as a management function of a telephone-authentication DLP policy, the DLP server assembly 30 performs a function of applying constraint conditions, such as, a number, a period, and so on, according to a policy defined by an owner of a data file when the telephone-authentication DLP file is generated. Secondly, as a management function of an ARS voice-phishing prevention policy, the DLP server assembly 30 blocks the information leakage in a case of the telephone authentication based on an ARS authentication. More particularly, in a case that the information leakage may be induced by making the user input a password and so on included in telephone-authentication DLP file by a type of requesting the telephone authentication to the user through similarly utilizing a voice phishing or a telephone authentication function, information of a scenario type, a gender, dialect, and so on during the ARS will be provided can be set when the telephone-authentication DLP file is generated in order to prevent the information leakage. Thirdly, as a management function of a CID(Contents Identification), the telephone-authentication DLP file should be globally and uniquely managed, and provides a unique identification number depending on the telephone-authentication DLP file even without any information such as an user identity and so on. Fourthly, as a management function of a policy depending on the telephone-authentication DLP file, the telephone-authentication DLP management server 33 performs a verification function of a policy (a telephone-authentication DLP policy information, and an ARS voice-phishing prevention policy information) by using the CID provided depending on the telephone-authentication DLP file as a key. That is, when the telephone-authentication DLP file is converted to the general file through the telephone authentication, a management of verifying whether the constraint conditions set in the corresponding DLP file is violated or not is performed. Fifthly, as a management function of a call forwarding setting based on a signal, when the user tries to convert the telephone-authentication DLP file to the general file through the telephone authentication, the DLP server assembly 30 blocks the telephone authentication by a hacker in the state that the hacker arbitrarily performs a call forwarding from the user's telephone to a hacker's telephone.

The TCP/IP 50 is a high speed backbone network of a large communication network being able to perform a large-scale service, and a long-distance voice and data service through using a transmission control protocol/internet protocol, for example, an internet network. Also, the TCP/IP 50 may be a next-generation wired network for providing a high-speed multimedia service based on ALL IP(internet protocol). In the present invention, the TCP/IP 50 mutually transfers a signal and data between the electronic authentication server assembly 40, the alliance mobile-service-company server assembly 60, and the other system.

Although it is shown that the alliance mobile-service-company server assembly 60 includes an A mobile-service-company server 60-1 and a B mobile-service-company server 60-2, this is for illustrative convenience. Thus, the alliance mobile-service-company server assembly 60 may include two or more of mobile-service-company servers, and one server of two or more of mobile-service-company servers is a server operated by the alliance mobile-service-company of the telephone terminal 11.

Figure 2:
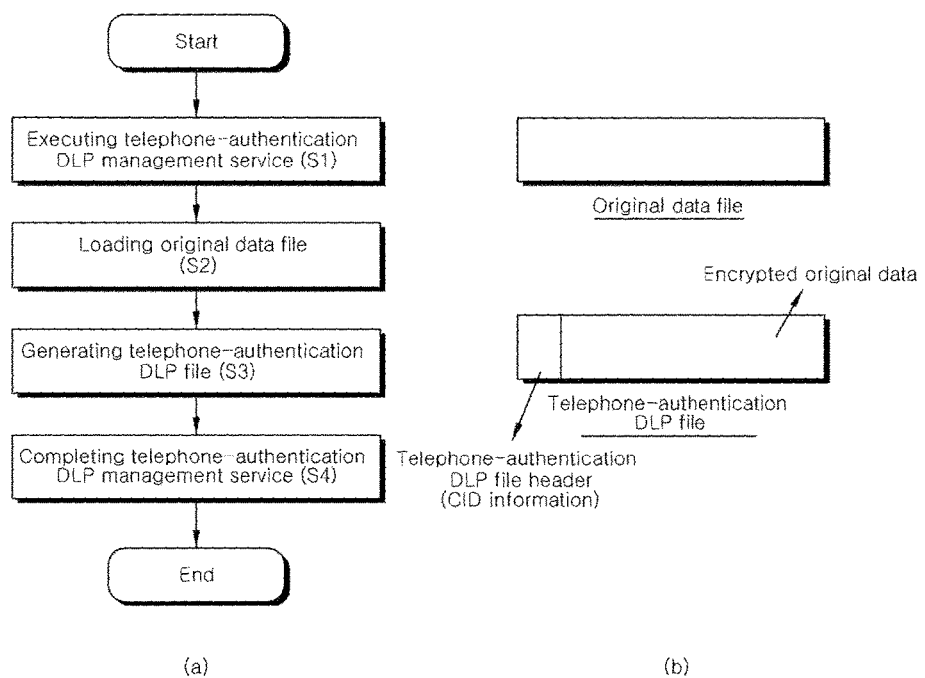
FIG. 2 illustrates a generation function of a telephone-authentication DLP file performed by the system for preventing the information leakage based on the telephone authentication shown in FIG. 1.

FIG. 2 illustrates a generation function of a telephone-authentication DLP file performed by the system for preventing the information leakage based on the telephone authentication shown in FIG. 1. Referring to FIG. 2, the telephone-authentication DLP file is generated by covering a telephone-authentication DLP file header to the original data file that is an initial data file.

The generated telephone-authentication DLP file cannot be normally read when the generated telephone-authentication DLP file is tried to be read without the telephone authentication. Also, the file cannot be read by a method to divide the telephone-authentication DLP file header including the telephone-authentication policy information through using hacking and so on in the state that the telephone authentication is not performed.

Figure 4:
FIG. 4 is an example of a user interface screen where a management function of an ARS voice-phishing prevention policy is performed by the system for preventing the information leakage based on the telephone authentication according to an embodiment of the present invention.

FIG. 3 is an example of a user interface screen (hereinafter, referred to as an UI screen) where a management function of a telephone-authentication DLP policy is performed by the system for preventing the information leakage based on the telephone authentication according to an embodiment of the present invention. FIG. 4 is an example of an UI screen where a management function of an ARS voice-phishing prevention policy is performed by the system for preventing the information leakage based on the telephone authentication according to an embodiment of to the present invention.

Meanwhile, a management function of a contents identification (CID) performed by the system for preventing the information leakage based on the telephone authentication according to the embodiment of the present invention will be described.

In the present invention, "CID=a hash function (file information+day and time of a generation of telephone-authentication DLP+DLP policy information+an ARS voice-phishing prevention policy information+other information)" is generated. That is, the CID is generated by using a combination of essential information and the telephone-authentication DLP policy information. The essential information may include the file information and the day and time of the generation of the telephone-authentication DLP file. The telephone-authentication DLP policy information is generated by randomly using one or two or more of the DLP policy information as a factor value. The telephone-authentication DLP policy information may include the DLP policy information and the ARS voice-phishing prevention policy information.

FIG. 5 illustrates a management function of a policy depending on a telephone-authentication DLP file performed by the system for preventing the information leakage based on the telephone authentication according to an embodiment of the present invention. Referring to FIG. 5, the telephone-authentication DLP file policy is managed by the telephone-authentication DLP service server 32. As shown in (c) of FIG. 5, the telephone-authentication DLP service server 32 performs and manages a verification of constraint conditions of all policies when the telephone authentication is tried in order to convert to the general file.

Figure 6:
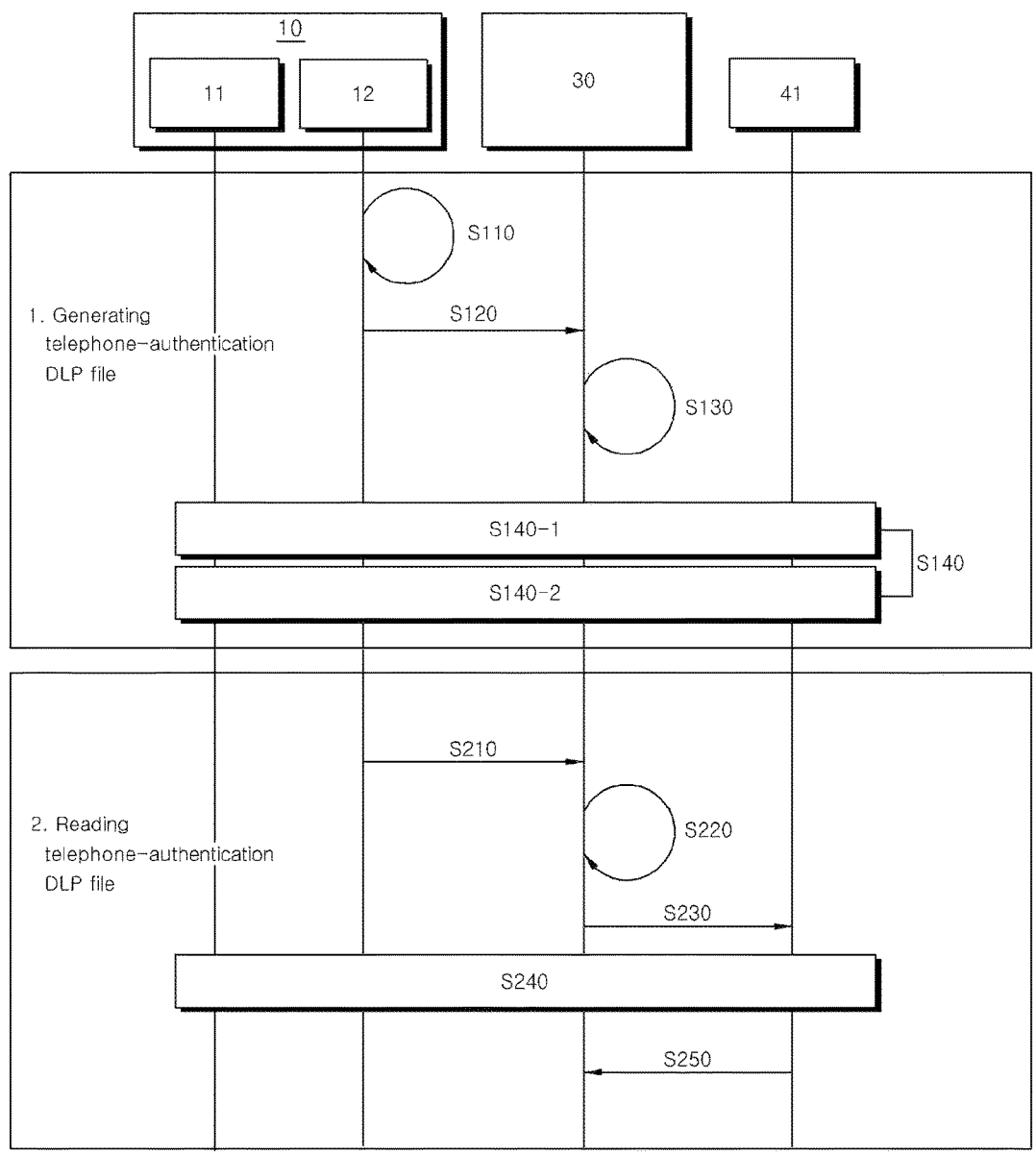
FIG. 6 schematically illustrates processes for generating a telephone-authentication DLP file and reading the telephone-authentication DLP file through a method for preventing an information leakage based on a telephone authentication according to an embodiment of the present invention.

FIG. 6 schematically illustrates processes for generating a telephone-authentication DLP file and reading the telephone-authentication DLP file through a method for preventing an information leakage based on a telephone authentication according to an embodiment of the present invention. Referring to FIG. 6, in order to generate a telephone-authentication DLP file, a generator that is a user of a user terminal assembly 10 including a server-connection terminal 12 sets a telephone-authentication DLP file policy by using the server-connection terminal 12 (S110). The telephone-authentication DLP file policy may include a telephone-authentication DLP policy, a voice-phishing prevention policy, and so on, thereby effectively enhancing secure.

After the step of S110, the server-connection terminal 12 sends the telephone-authentication DLP file policy and requests a generation of a telephone-authentication DLP file to the DLP server assembly 30 through an internet network 20 (S120).

After the step of S120, the DLP server assembly 30 generates a contents identification (CID) by using information including the telephone-authentication DLP file policy and stores a telephone-authentication DLP file information comprising the CID and the telephone-authentication DLP file policy (S130).

After the step of S130, a telephone-authentication DLP file is generated by using the CID as a header of an original data file corresponding to a general file (S140). This is performed by the server-connection terminal 12 (S140-1) or is performed by the DLP server assembly 30 (S140-2).

By covering or recording the telephone-authentication DLP file header to the original data file, a confirmation process is performed through the telephone authentication when the reader tries to read the telephone-authentication DLP file. Thus, the security of data effectively enhanced, and also, a location of the data can be known through the telephone authentication even though the data is leaked. Accordingly, the information leakage can be prevented.

On the other hand, a step in which the server-connection terminal 12 or the DLP server assembly 30 generates an encryption key and encrypts the original data file through using the encryption key may be further included. Accordingly, in the telephone-authentication DLP file, the CID covers the original data file that is encrypted as the header. The telephone-authentication DLP file can be read by performing the telephone authentication and by also performing a password input after the telephone authentication. Accordingly, the security can be enhanced.

As stated in the above, the generations of the telephone-authentication DLP file may be classified into a generation based on a client and a generation based on a server. Examples of them will be described.

Figure 7:
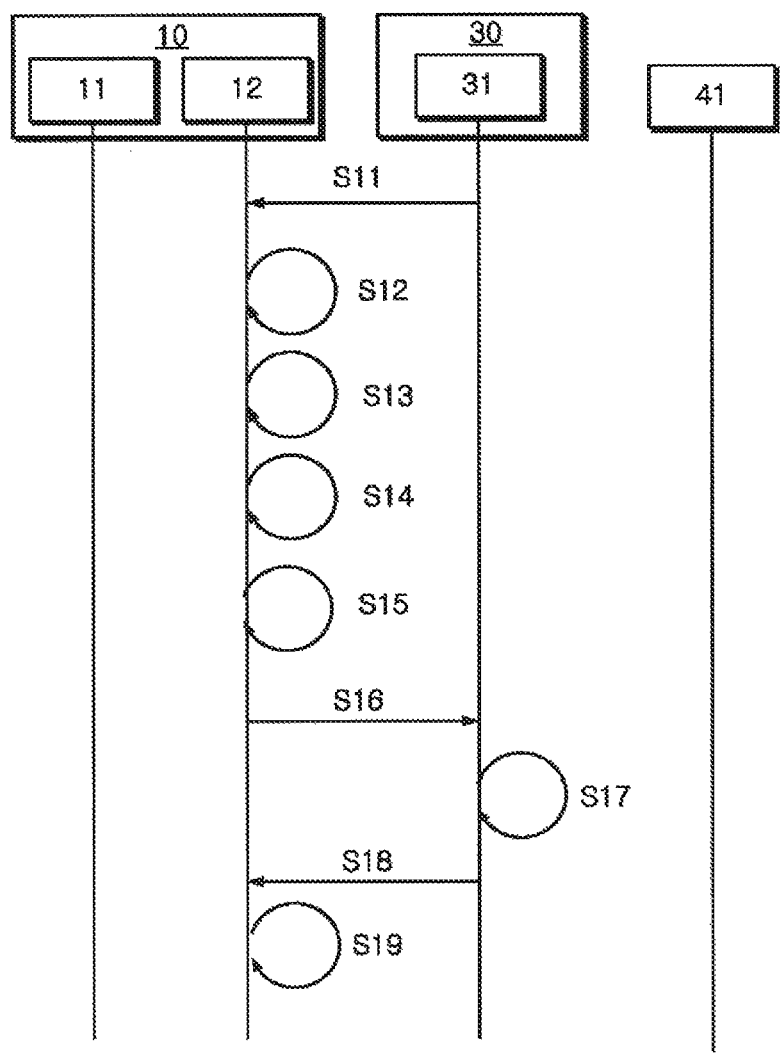
FIG. 7 illustrates a process of generating a telephone-authentication DLP file by a telephone-authentication DLP management service type based on a client of the method for preventing the information leakage based on the telephone authentication according an embodiment of the present invention.

FIG. 7 illustrates a process of generating a telephone-authentication DLP file by a telephone-authentication DLP management service type based on a client of the method for preventing the information leakage based on the telephone authentication according an embodiment of the present invention. The DLP server assembly 30 includes the telephone-authentication DLP file server 31, and the telephone-authentication DLP file is generated by the server-connection terminal 12 since the generation is based on the client.

When described in detail with reference to FIG. 7, the telephone-authentication DLP file server 31 performs a download of a telephone-authentication DLP client to the server-connection terminal 12 through the internet network 20.

After the step of S11, the server-connection terminal 12 installs and executes the downloaded program (S12).

After the step of S12, the server-connection terminal 12 reads the original data file that will be generated as the telephone-authentication DLP file (S13).

After the step of S13, the server-connection terminal 12 sets a telephone-authentication DLP file policy (S14). In this instance, the telephone-authentication DLP file policy includes a telephone-authentication DLP policy and a voice-phishing prevention policy.

After the step of S14, the server-connection terminal 12 generates an encryption key (S15).

After the step of S15, the server-connection terminal 12 sends the encryption key generated in the step of S15, the telephone-authentication DLP file policy generated in the step of S14, and requests a generation of the telephone-authentication DLP file to the telephone-authentication DLP file server 31 through the internet network 20.

After the step of S16, the telephone-authentication DLP file server 31 generates a CID, and stores the telephone-authentication DLP file information including the CID, the telephone-authentication DLP file policy, and so on (S17).

After the step of S17, the telephone-authentication DLP file server 31 sends the CID generated in the step of S17 to the server-connection terminal 12 through the internet network 20 (S18).

The server-connection terminal 12 generates the telephone-authentication DLP file to include the CID as the header (S19). In this instance, the server-connection terminal 12 performs a general-file encryption regarding the original data file by using the encryption key generated in the step of S15, and thus, generates the telephone-authentication DLP file.

Figure 8:
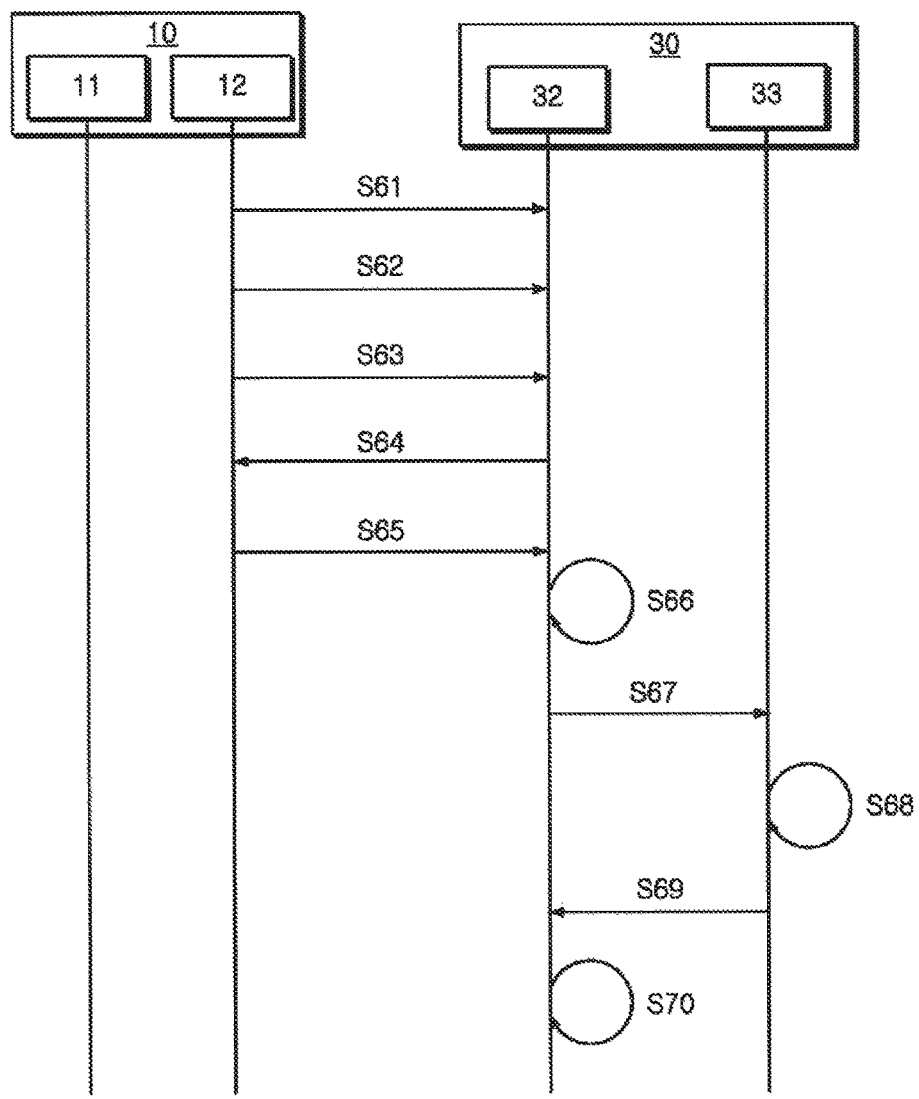
FIG. 8 illustrates a process of generating a telephone-authentication DLP file by a telephone-authentication DLP management service type based on a server of the method for preventing the information leakage based on the telephone authentication according an embodiment of the present invention.

FIG. 8 illustrates a process of generating a telephone-authentication DLP file by a telephone-authentication DLP management service type based on a server of the method for preventing the information leakage based on the telephone authentication according an embodiment of the present invention. The DLP server assembly 30 includes the DLP link server 32 and the telephone-authentication DLP management server 33, and the telephone-authentication DLP file is generated by the DLP server assembly 30 since the generation of the telephone-authentication DLP file is based on the server.

As described in detail with reference to FIG. 8, the server-connection terminal 12 completes a DPL link-server authentication to the DLP link server 32 through the internet network 20 (S61).

After the step of S61, the server-connection terminal 20 completes a setting of a telephone-authentication DLP file policy to the DLP link server 32 through the internet network 20 (S62).

After the step of S62, the server-connection terminal 12 uploads or sends the original data file to the DLP link server 32 through the internet network 20 and requests a generation of the telephone-authentication DLP file to the DLP link server (S63). In this instance, the generation of the telephone-authentication DLP file may be an option.

After the step of S63, the DLP link server 32 may request a confirmation and a change of detailed policy of the telephone-authentication DLP file and an additional information input to the server-connection terminal 12 through the internet network 20 (S64). After the step of S64, the server-connection terminal 12 may request an upload or a transfer of a file to the DLP link server 32 after the information change or the additional information input according to the request of the step of S64 through the internet network 20 (S65).

After the step of S65, the DLP link server 32 stores the original data file that is the general file (S66).

After the step of S66, the DLP link server 32 requests the telephone-authentication DLP management server 33 to convert the general file to the telephone-authentication DLP file (S67). In this instance, the DLP link server 32 also transfers the telephone-authentication DLP policy information to the telephone-authentication DLP management server 33.

After the step of S67, the telephone-authentication DLP management server 33 generates the CID, and then, stores the DLP file information including the CID, the telephone-authentication DLP policy information, and so on, and generates an encryption key, thereby generating the telephone-authentication DLP file (S68).

After the step of S68, the telephone-authentication DLP management server 33 sends a CID number to the DLP link server 32 (S69).

Accordingly, the DLP link server 32 performs an update management to a CID mapping table using the original file that is the general file and the CID number (S70).

A telephone authentication procedure should be performed when a reader reads the telephone-authentication DLP file generated by the above method. Hereinafter, a process for converting a telephone-authentication DLP file to an original data file that is a general file through using a telephone authentication by a reader will be described.

Referring to FIG. 6, a reader as a user of a user terminal assembly 10 including a server-connection terminal 12 requests a reading of a telephone-authentication DLP file to a DLP server assembly 30 through using an internet network 20 (S210).

After the step of S210, the DLP server assembly 30 verifies a telephone-authentication DLP file policy (S220). The verification of the telephone-authentication DLP file policy may be a confirmation of a number, time, and a country of the reading, and a qualification of the reader. After the verification of the telephone-authentication DLP file policy, the DLP server assembly 30 sends the request of the telephone authentication to a telephone-authentication server 41 (230). In this instance, the DLP server assembly 30 requests the telephone authentication by a telephone number of a generator, a telephone number of a reader, a parallel authentication, or a direct input of a telephone number of the reader.

After the step of S230, the telephone-authentication server 41 sends a result of the telephone authentication to the DLP server assembly 30 after the telephone authentication is performed (S240). When the DLP server assembly 30 requests the telephone authentication by the telephone number of the generator, the telephone-authentication server 41 requests the telephone authentication to an approver terminal 90 designated when the telephone-authentication DLP file is generated. When the DLP server assembly 30 requests the telephone authentication by the telephone number of the reader, the telephone-authentication server 41 requests the telephone authentication to a reader terminal 80 designated when the telephone-authentication DLP file is generated.

Also, the user terminal assembly 10 may further include a telephone terminal 11. When the DLP server assembly 30 requests the telephone authentication by the parallel authentication, the telephone-authentication server 41 waits the parallel authentication by the telephone terminal 11. Meanwhile, when the server-connection terminal 12 in the step of S210 enters the telephone number of the reader to the DLP server assembly 30 and the DLP server assembly 30 in the step of S230 requests the telephone authentication by the direct input of the telephone number of the reader, the telephone-authentication server 41 in the step of S240 requests the telephone authentication by the direct input of the telephone number to the telephone terminal 11.

Therefore, the telephone-authentication DLP file is converted to the general file and the reader can read the telephone-authentication DLP file when the telephone authentication is approved. Also, in the case that the original data file is encrypted, a step for transferring an encryption key from the DLP server assembly 30 to the server-connection terminal 12 may be further included.

The method for reading the telephone-authentication DLP file may be classified into a telephone-authentication DLP management service type based on a client and a telephone-authentication DLP management service type based on a server, as in the generation of the telephone-authentication DLP file. The telephone-authentication DLP management service type based on the client may be classified into a case that an additional client is necessary and another case that an additional client is not necessary. Hereinafter, examples will be described.

Figure 9:
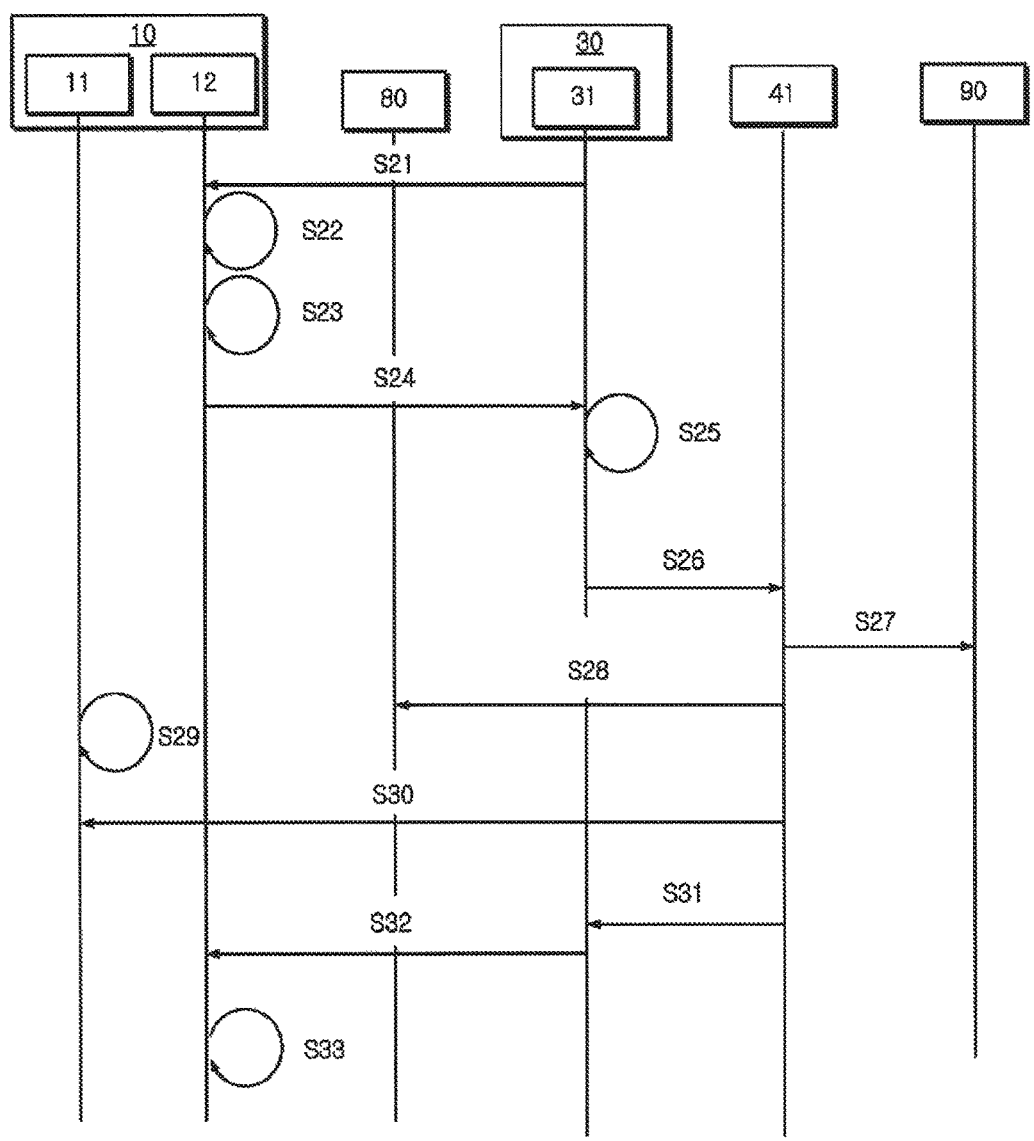
FIG. 9 illustrates a process of reading the telephone-authentication DLP file by using a telephone-authentication DLP management service type based on a client of the method for preventing the information leakage based on the telephone authentication according to an embodiment of the present invention in a case that an additional client is necessary.

FIG. 9 illustrates a process of reading the telephone-authentication DLP file by using a telephone-authentication DLP management service type based on a client of the method for preventing the information leakage based on the telephone authentication according to an embodiment of the present invention in a case that an additional client is necessary. The DLP server assembly 30 includes the telephone-authentication DLP file server 31, and the telephone-authentication DLP file server 31 performs the same function as the DLP server assembly 30.

As described in detail with reference to FIG. 9, the telephone-authentication DLP file server 31 performs a download of a telephone-authentication DLP client to the server-connection terminal 12 through the internet network 20 (S21).

After the step of S21, the server-connection terminal 12 installs and executes the downloaded program (S22).

After the step of S22, the server-connection terminal 12 performs the reading of the telephone-authentication DLP file that will be read (S23).

After the step of S23, the server-connection terminal 12 sends the request of the reading, which is executed in the step of S23, about the telephone-authentication DLP file to the telephone-authentication DLP file server 31 (S24). In this instance, it is preferable that the server-connection terminal 12 sends the request of the reading about the telephone-authentication DLP file in the step of S42 through inputting the CID and the telephone number of the reader in a case of a direct input of a telephone number of a reader.

After the step of S24, the telephone-authentication DLP file server 31 performs and completes a verification of the telephone-authentication DLP file policy (S25). Here, as shown in FIG. 4, the verification of the telephone-authentication DLP file policy means the confirmation of a number, time, and a country of the reading, a qualification of the reader, and so on.

After the step of S25, the telephone-authentication DLP file server 31 sends the request of the telephone authentication to the telephone-authentication server 41 through a direct privation internet line or the internet network 20 (S26). In this instance, the request of the telephone authentication may be performed by one of a telephone number of a generator, a telephone number of a reader, a parallel authentication, a direct input of a telephone number of a reader.

After the step of S26, when the telephone-authentication server 41 uses the telephone number of the generator of the step of S26, the telephone-authentication server 41 sends the request of the telephone authentication to an approver terminal 90 designated when the telephone-authentication DLP file is generated (S27).

Meanwhile, after the step of S26, when the telephone-authentication server 41 uses the telephone number of the reader of the step of S26, the telephone-authentication server 41 sends the request of the telephone authentication to a designated reader terminal 80 (S28).

Meanwhile, after the step of S26, when the telephone-authentication server 41 uses the parallel authentication of the step of S26, the telephone-authentication server 41 waits the parallel authentication by a telephone terminal 11 (S29).

As a final case, after the step of S26, when the telephone-authentication server 41 uses the direct input of the telephone number of the reader of the step of S26, the telephone-authentication server 41 sends the request of the telephone authentication of the direct input of the telephone number to a telephone terminal 11 (S30).

On the other hand, when the telephone authentication by one of the steps of S27 to S30 is completed, the telephone-authentication server 41 sends a result of the telephone authentication to the telephone-authentication DLP file server 31 through the internet network 20 (S31).

After the step of S31, the telephone-authentication DLP file server 31 sends the encryption key that is generated in the step of S15 shown in FIG. 7 and is received by the telephone-authentication DLP file server 31 to the server-connection terminal 12 through the internet network 20 (S32).

After the step of S32, the server-connection terminal 12 completes a conversion of the telephone-authentication DLP file to a general file using the received encryption key (S33).

Figure 10:
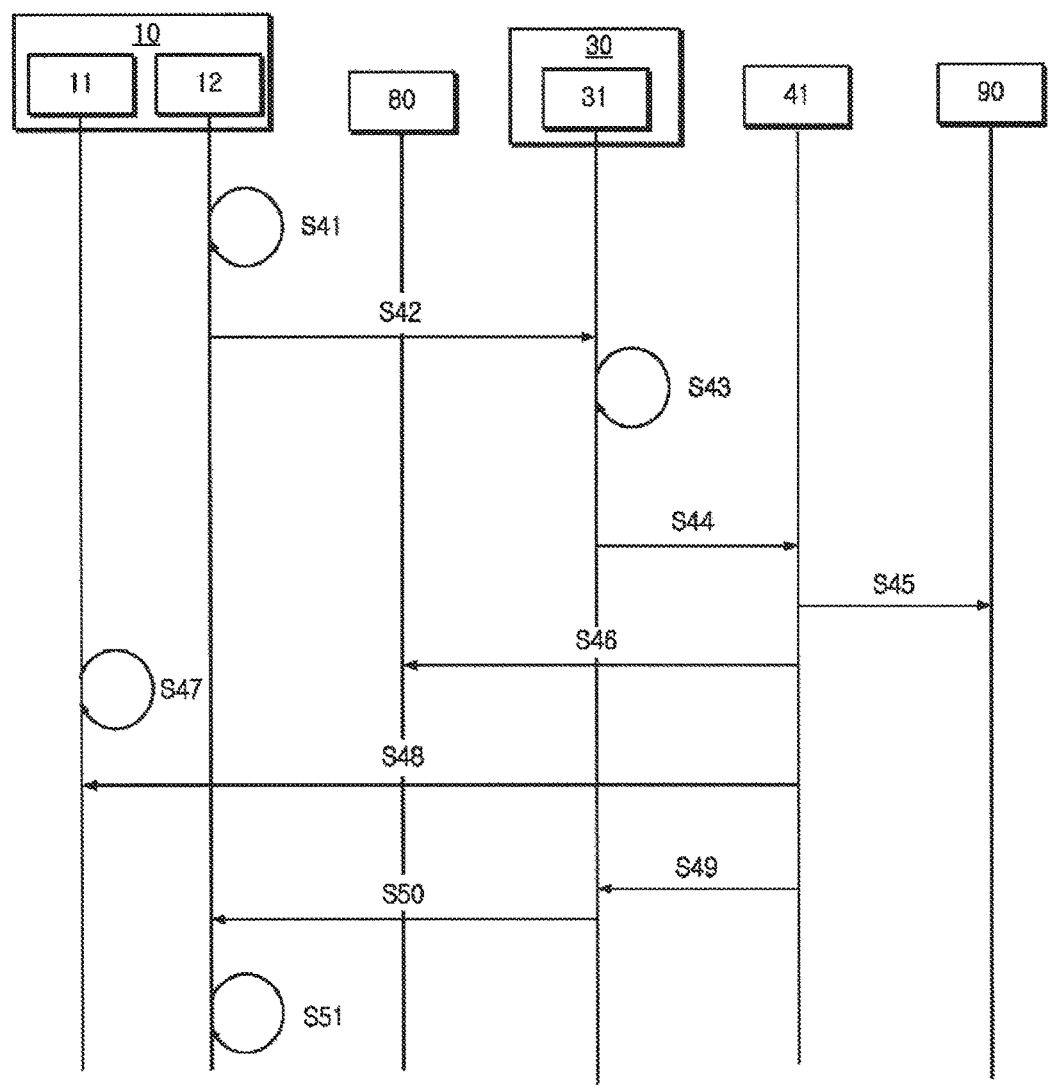
FIG. 10 illustrates a process of reading the telephone-authentication DLP file by using a telephone-authentication DLP management service type based on a client of the method for preventing the information leakage based on the telephone authentication according to an embodiment of the present invention in a case that an additional client is not necessary, as contrasted with the case shown in FIG. 9.

FIG. 10 illustrates a process of reading the telephone-authentication DLP file by using a telephone-authentication DLP management service type based on a client of the method for preventing the information leakage based on the telephone authentication according to an embodiment of the present invention in a case that an additional client is not necessary, as contrasted with the case shown in FIG. 9. The DLP server assembly 30 includes the telephone-authentication DLP file server 31, and the telephone-authentication DLP file server 31 performs the same function as the DLP server assembly 30.

As described in detail with reference to FIG. 10, the server-connection terminal 12 executes a telephone-authentication DLP file that will be read (S41).

After the step of S41, the server-connection terminal 12 sends the request of the reading, which is executed in the step of S41, about the telephone-authentication DLP file to the telephone-authentication DLP file server 31 (S42). In this instance, it is preferable the server-connection terminal 12 sends the request of the reading of the telephone-authentication DLP file in the step of S42 through inputting the CID and the telephone number of the reader in a case of a direct input of a telephone number of a reader.

After the step of S42, the telephone-authentication DLP file server 31 performs and completes a verification of the telephone-authentication DLP file policy (S43). Here, as shown in FIG. 4, the verification of the telephone-authentication DLP file policy means the confirmation of a number, time, and a country of the reading, a qualification of the reader, and so on.

After the step of S43, the telephone-authentication DLP file server 31 sends the request of the telephone authentication to the telephone-authentication server 41 through a direct private internet line or the internet network 20 (S44). In this instance, the request of the telephone authentication may be performed by one of a telephone number of a generator, a telephone number of a reader, a parallel authentication, a direct input of a telephone number of a reader.

After the step of S44, when the telephone-authentication server 41 uses the telephone number of the generator of the step of S44, the telephone-authentication server 41 sends the request of the telephone authentication to an approver terminal 90 designated when the telephone-authentication DLP file is generated (S45).

Meanwhile, after the step of S44, when the telephone-authentication server 41 uses the telephone number of the reader of the step of S44, the telephone-authentication server 41 sends the request of the telephone authentication to a designated reader terminal 80 (S46).

Meanwhile, after the step of S44, when the telephone-authentication server 41 uses the parallel authentication of the step of S44, the telephone-authentication server 41 waits the parallel authentication by a telephone terminal 11 (S47).

As a final case, after the step of S44, when the telephone-authentication server 41 uses the direct input of the telephone number of the reader of the step of S44, the telephone-authentication server 41 sends the request of the telephone authentication of the direct input of the telephone number to a telephone terminal 11 (S48).

On the other hand, when the telephone authentication by one of the steps of S45 to S48 is completed, the telephone-authentication server 41 sends a result of the telephone authentication to the telephone-authentication DLP file server 31 through the internet network 20 (S49).

After the step of S49, the telephone-authentication DLP file server 31 sends the encryption key that is generated in the step of S15 shown in FIG. 7 and is received by the telephone-authentication DLP file server 31 to the server-connection terminal 12 through the internet network 20 (S50).

After the step of S50, the server-connection terminal 12 completes a conversion of the telephone-authentication DLP file to the general file using the received encryption key (S51).

Figure 11:
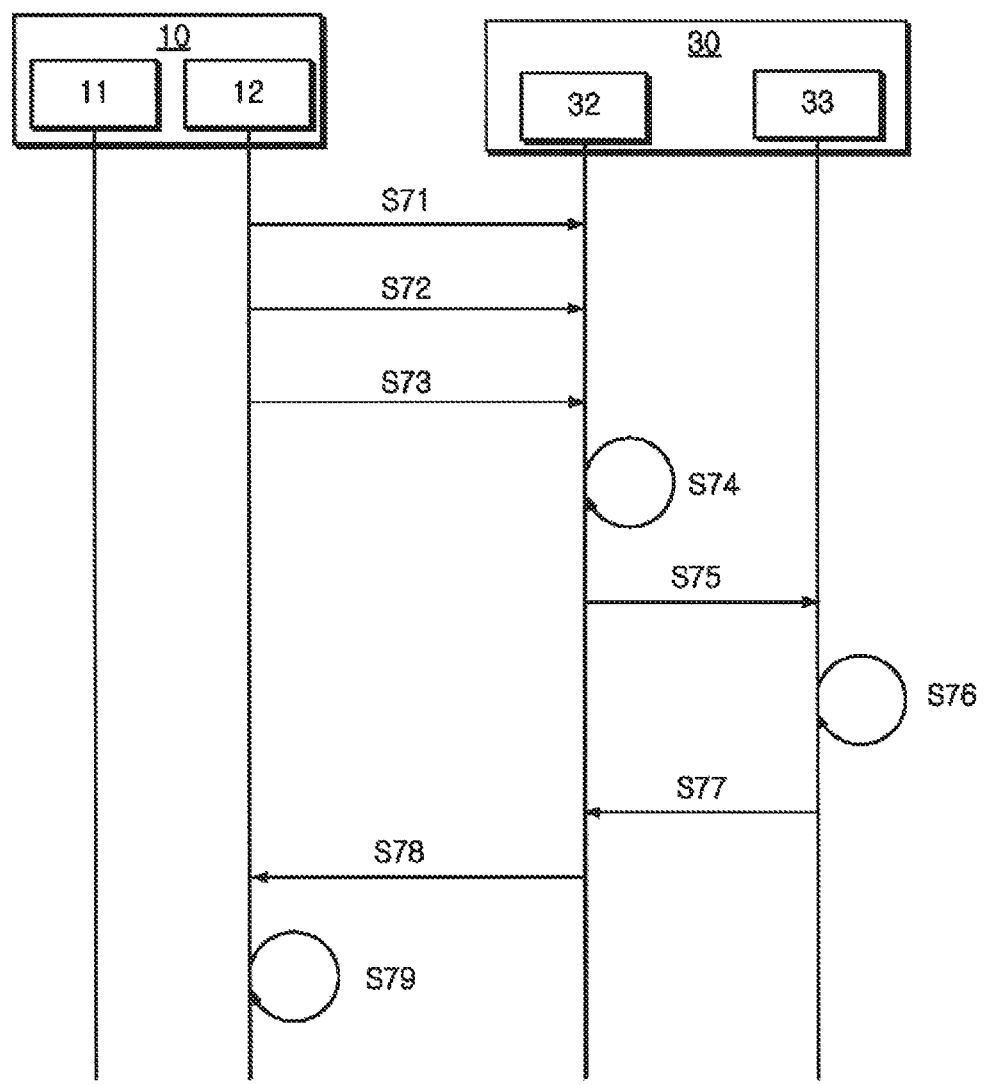
FIG. 11 illustrates a process of reading the telephone-authentication DLP file by using a telephone-authentication DLP management service type based on a server of the method for preventing the information leakage based on the telephone authentication according to an embodiment of the present invention in a case that the telephone-authentication DLP file is converted to a general file at a DLP link server and the general file is downloaded.

FIG. 11 illustrates a process of reading the telephone-authentication DLP file by using a telephone-authentication DLP management service type based on a server of the method for preventing the information leakage based on the telephone authentication according to an embodiment of the present invention in a case that the telephone-authentication DLP file is converted to a general file by a DLP link server and then the general file is downloaded. The DLP server assembly 30 includes the DLP link server 32 and the telephone-authentication DLP management server 33. The DLP link server 32 performs a function of the DLP server assembly 30 in the (a) step, and the telephone-authentication DLP management server 33 performs a function of the DLP server assembly 30 in the (b) step and the (c) step.

Referring to FIG. 11, the server-connection terminal 12 completes a DLP link-server authentication to the DLP link server 32 through the internet network 20 (S71).

After the step of S71, the server-connection terminal 12 requests a file download to the DLP link server 32 through the internet network 20 (S72).

After the step of S72, the server-connection terminal 12 selects a method of a file download and sends the same to the DLP link server 32 through the internet network 20 (S73). Hereinafter, an assumed case where an option of 'a download after a conversion to a general file' is selected will be described.

After the step of S73, the DLP link server 32 inquiries a CID mapping file information by using an original data file that is a general file and a CID information (S74).

After the step of S74, the DLP link server 32 requests the telephone authentication for converting to the general file and also transfers the CID information to the telephone-authentication DLP management server 33 (S75).

After the step of S75, the telephone-authentication DLP management server 33 completes the conversion of the telephone-authentication DLP file to the general file (S76). In this instance, the telephone-authentication DLP management server 33 performs a series of the procedure as exemplified in 'the reading of the telephone-authentication DLP management based on a client', such as, the DLP policy verification, the request of the telephone-authentication according to the telephone-authentication verification policy, the telephone-authentication according to the ARS voice-phishing prevention policy, and so on.

After the step of S76, the telephone-authentication DLP management server 33 provides a download link of the general file to the DLP link server 32 (S77).

After the step of S77, the DLP link server 32 provides the download link of the general file to the server-connection terminal 12 through the internet network 20 (S78). In this instance, in the case that the original data file is encrypted, the DLP link server 32 transfers an encryption key to the server-connection terminal 12.

By the above, the sever-connection terminal 12 completes the download of the general file (S79).

Meanwhile, as another embodiment of the present invention, when the telephone-authentication DLP file is read, a user may download an attached file of a telephone-authentication DLP file and then directly convert the telephone-authentication DLP file to the general file. In this case, the reading is performed by in the method same as the method of the reading of the telephone-authentication DLP file based on the client.

Figure 12:
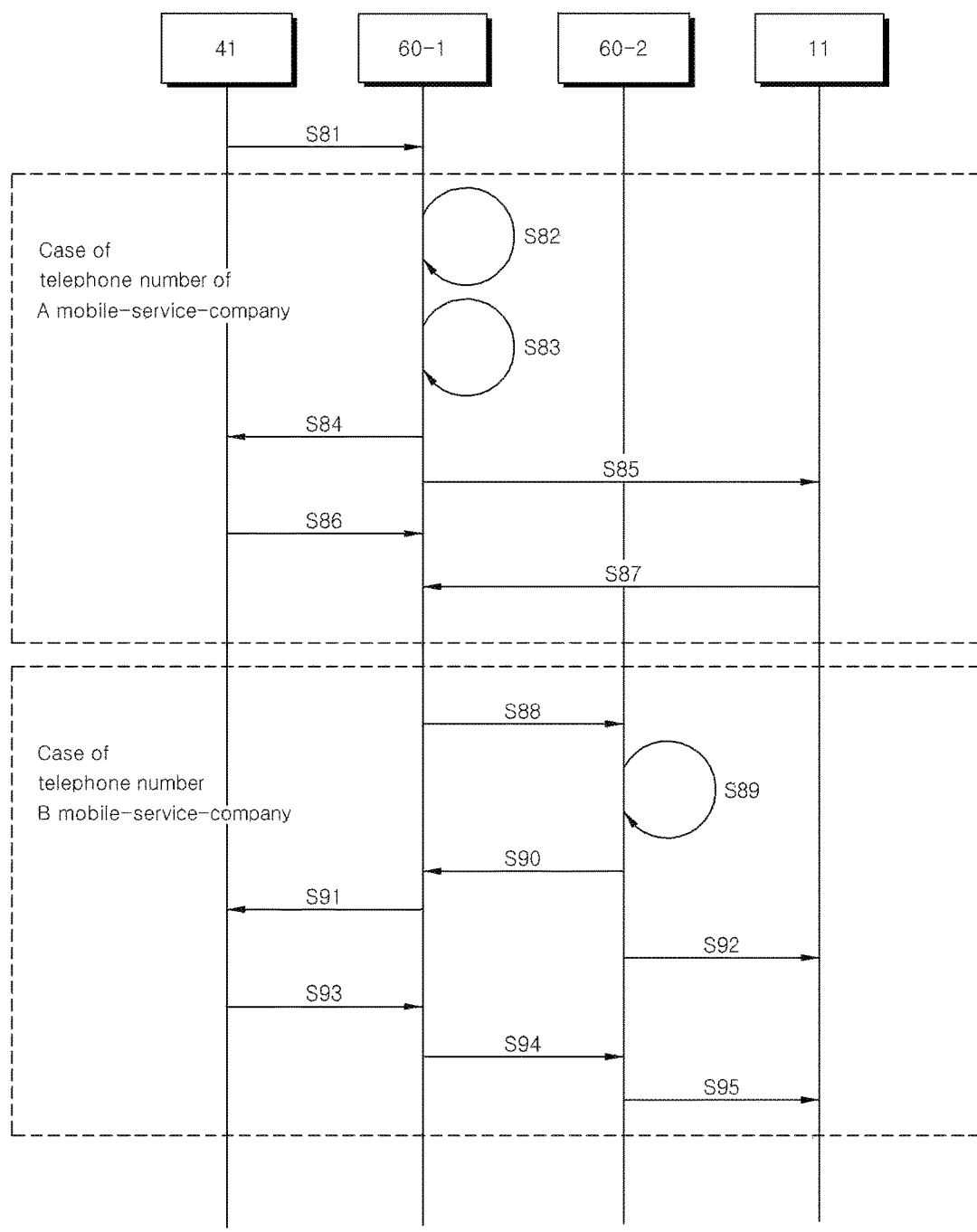
FIG. 12 is a flowchart for illustrating a process of managing a call forwarding setting based on a signal of the method for preventing the information leakage based on the telephone authentication according to an embodiment of the present invention.

FIG. 12 is a flowchart for illustrating a process of managing a call forwarding setting based on a signal of the method for preventing the information leakage based on the telephone authentication according to an embodiment of the present invention. Referring to FIG. 12, a telephone-authentication server 41 requests a telephone authentication using a telephone number of a user to an A mobile-service-company server 60-1 (S81).

After the step of S81, the A mobile-service-company server 60-1 inquires mobile-service-company information of the user by using the telephone number of the user (S82).

After the step of S82, the A mobile-service-company sever 60-1 confirms whether there is a call forwarding or not (S83).

After the step of S83, the A mobile-service-company server 60-1 transfers a signal information of the call forwarding after the confirmation of the call forwarding in the step of S83 to the telephone-authentication server 41 (S84).

After the step of S84, the A mobile-service-company server 60-1 requests the telephone authentication to the telephone terminal 11 of the user (S85).

After the step of S85, the telephone-authentication server 41 requests an end of a call to the A mobile-service-company server 60-1 (S86), and the telephone terminal 11 requests an end of a call to the A mobile-service-company server 60-1 (S87). In the procedures of S82 to S87 according to the above, the telephone number of the user is the telephone number of the A mobile-service-company.

Meanwhile, a case where the telephone number of the user is a telephone number of a B mobile-service-company is as follows.

An A mobile-service-company server 60-1 inquires mobile-service-company information of the user and requests a telephone authentication to a B mobile-service-company server 60-2 (S88).

After the step of S88, the B mobile-service-company sever 60-2 confirms whether there is a call forwarding or not (S89).

After the step of S89, the B mobile-service-company server 60-2 transfers a signal information of the call forwarding to the A mobile-service-company server 60-1 (S90), and the A mobile-service-company server 60-1 transfers a signal information of the call forwarding to the telephone-authentication server 41 (S91).

After the step of S91, the telephone-authentication server 41 requests an end of a call to the A mobile-service-company server 60-1 (S93), and the A mobile-service-company server 60-1 requests an end of a call to the B mobile-service-company server 60-2 (S94).

After the step of S94, the B mobile-service-company server 60-2 requests an end of a call to telephone terminal 11.

Further, the present invention may be achieved by a code that a computer can read at a recording medium that the computer can read. The recording medium that the computer can read includes all kinds of recording devices for storing data that are readable by a computer system.

As an example of the recording medium that the computer can read, a read-on memory (ROM), a random-access memory (RAM), a compact disc read-on memory (CD-ROM), a magnetic tape, a floppy disk, an optical data storage, and so on are used. In addition, the present invention may be achieved by a form of carrier wave (for example, a transfer through an internet).

In addition, the recording medium that the computer can read may be distributed to a computer system connected through a network, and the code that the computer can read may be stored and executed by a distributed system. In addition, functional programs, codes, and code segments for achieving the present invention may be easily inferred by programmers in the art where the present invention is pertained.

Although the preferred embodiments of the present invention have been disclosed in the specification and the drawings and specified terms are used, these are only for easily describing technical contents of the present invention and for fully understanding the present invention. Thus, the preferred embodiments and the specified terms do not limit the present invention. Those skilled in the art will appreciate that various modifications, additions and substitutions are possible, without departing from the scope and spirit of the present invention as disclosed in the accompanying claims.

The invention claimed is:

1. A method for preventing an information leakage based on a telephone authentication, comprising:
   a first step in which a telephone-authentication data-loss-prevention (DLP) file policy is set by a generator as a user of a user terminal assembly 10 comprising a server-connection terminal 12 through using the server-connection terminal 12 and the server-connection terminal 12 sends the telephone-authentication DLP file policy and requests a generation of a telephone-authentication DLP file to a DLP server assembly 30 through an internet network 20;
   a second step in which the DLP server assembly 30 generates a contents identification (CID) by using information comprising the telephone-authentication DLP file policy and stores a telephone-authentication DLP file information comprising the CID and the telephone-authentication DLP file policy; and
   a third step in which the server-connection terminal 12 or the DLP server assembly 30 generates the telephone-authentication DLP file, wherein the telephone-authentication DLP file comprising the CID as a header of an original data file that is a general file,
   wherein a telephone authentication is needed when a reader reads the generated telephone-authentication DLP file.

2. The method according to claim 1, further comprising:
   a step in which the server-connection terminal 12 or the DLP server assembly 30 generates an encryption key and encrypts the original data file through using the encryption key.

3. The method according to claim 1, wherein the telephone-authentication DLP file policy includes a telephone-authentication DLP policy and a voice-phishing prevention policy.

4. The method according to claim 1, wherein the telephone authentication comprises:
   an (a) step in which the reader as a user of the user terminal assembly 10 comprising the server-connection terminal 12 requests a reading of the telephone-authentication DLP file to the DLP server assembly 30 by using the server-connection terminal 12;
   a (b) step in which the DLP server assembly 30 verifies the telephone-authentication DLP file policy and sends a request of the telephone authentication to a telephone-authentication server 41; and
   a (c) step in which the telephone-authentication server 41 sends a result of the telephone authentication to the DLP server assembly 30 after the telephone authentication is performed,
   wherein the telephone-authentication DLP file is converted to the general file and is readable when the telephone authentication is performed and is approved.

5. The method according to claim 4, wherein, when the DLP server assembly 30 in the (b) step requests the telephone authentication by a telephone number of the generator, the telephone-authentication server 41 in the (c) step requests the telephone authentication to an approver terminal 90 designated when the telephone-authentication DLP file is generated.

6. The method according to claim 4, wherein, when the DLP server assembly 30 in the (b) step requests the telephone authentication by a telephone number of the reader, the telephone-authentication server 41 in the (c) step requests the telephone authentication to a reader terminal 80 designated when the telephone-authentication DLP file is generated.

7. The method according to claim 4, wherein, when the DLP server assembly 30 in the (b) step requests the telephone authentication by a parallel authentication, the telephone-authentication server 41 in the (c) step waits the parallel authentication by a telephone terminal 11.

8. The method according to claim 4, wherein the user terminal assembly 10 further comprises a telephone terminal 11, and
   when the server-connection terminal 12 in the (a) step enters a telephone number of the reader to the DLP server assembly 30 and the DLP server assembly 30 in the (b) step requests the telephone authentication by a direct input of a telephone number of the reader, the telephone-authentication server 41 in the (c) step requests the telephone authentication by the direct input of the telephone number to the telephone terminal 11.

9. The method according to claim 4, wherein, in the verification of the telephone-authentication DLP file policy, at least one of a number, time, and a country of the reading, and a qualification of the reader is confirmed.

10. The method according to claim 4, wherein the DLP server assembly 30 comprises a DLP link server 32 and a telephone-authentication DLP management server 33, wherein the DLP link server 32 performing a function of the DLP server assembly 30 in the (a) step and the telephone-authentication DLP management server 33 performing a function of the DLP server assembly 30 in the (b) step and the (c) step,
   wherein the method further comprises:
   an (a-1) step after the (a) step, wherein the (a-1) step in which the DLP link server 32 inquiries a CID mapping file information by using the original data file that is the general file and the CID information, and sends the CID information and requests the telephone authentication for converting to the general file to the telephone-authentication DLP management server 33; and
   a (c-1) step and a (c-2) step after the (c) step, wherein the (c-1) step in which the telephone-authentication DLP management server 33 converts the telephone-authentication DLP file to the general file and provides a download link of the general file to the DLP link server 32, wherein the (c-2) step in which the DLP link server 32 provides the download link of the general file to the server-connection terminal 12 through the internet network 20.

11. A system for preventing an information leakage based on a telephone authentication, wherein the system comprising a server-connection terminal 12 used by a user for generating or reading a telephone-authentication DLP file; and a DLP server assembly 30 connected to the server-connection terminal 12 through an internet network 20,
   wherein a telephone-authentication DLP file policy is set by the user through using the server-connection terminal 12 and the server-connection terminal 12 sends the telephone-authentication DLP file policy and requests a generation of a telephone-authentication DLP file to the DLP server assembly 30 to, the DLP server assembly 30 generates a contents identification (CID) by using information comprising the telephone-authentication DLP file policy and stores a telephone-authentication DLP file information comprising the CID and the telephone-authentication DLP file policy, the server-connection terminal 12 or the DLP server assembly 30 generates the telephone-authentication DLP file comprising the CID as a header of an original data file that is a general file, and a telephone authentication is needed when a reader reads the generated telephone-authentication DLP file.

12. The system according to claim 11, wherein the server-connection terminal 12 or the DLP server assembly 30 generates an encryption key and encrypts the original data file through using the encryption key.

13. The system according to claim 11, further comprising:

a telephone-authentication server 41 for performing the telephone authentication when the reader requests a reading of the telephone-authentication DLP file, wherein, when the server-connection terminal 12 requests the reading of the telephone-authentication DLP file to the DLP server assembly 30 and the DLP server assembly 30 verifies the telephone-authentication DLP file policy and requests the telephone authentication to the telephone-authentication server 41, the telephone-authentication server 41 sends a result of the telephone authentication to the DLP server assembly 30 after the telephone authentication is performed, and the telephone-authentication DLP file is converted to the general file and is readable when the telephone authentication is approved.

* * * * *